United States Patent
Yeh

(10) Patent No.: US 9,673,871 B2
(45) Date of Patent: Jun. 6, 2017

(54) WIRELESS MOBILE DEVICE

(71) Applicant: Shenzhen South Silicon Valley Microelectronics Co., Limited, Hsinchu County (TW)

(72) Inventor: Ming-Hao Yeh, Taipei (TW)

(73) Assignee: SHENZHEN SOUTH SILICON VALLEY MICROELECTRONICS CO., LIMITED, Hsinchu County (TW)

( * ) Notice: Subject to any disclaimer, the term of this patent is extended or adjusted under 35 U.S.C. 154(b) by 0 days.

(21) Appl. No.: 15/149,575

(22) Filed: May 9, 2016

(65) Prior Publication Data
US 2017/0099087 A1    Apr. 6, 2017

(30) Foreign Application Priority Data

Oct. 1, 2015   (TW) .............................. 104132392 A

(51) Int. Cl.
| | |
|---|---|
| H01Q 11/12 | (2006.01) |
| H04B 1/04 | (2006.01) |
| H04B 1/38 | (2015.01) |
| H04B 5/00 | (2006.01) |
| H04W 4/00 | (2009.01) |

(52) U.S. Cl.
CPC .......... *H04B 5/0081* (2013.01); *H04W 4/008* (2013.01)

(58) Field of Classification Search
CPC ........... H01Q 1/44; H01Q 1/46; H04Q 1/0458

USPC ................. 455/66.1, 572, 121, 129
See application file for complete search history.

(56) References Cited

U.S. PATENT DOCUMENTS

| | | | |
|---|---|---|---|
| 2003/0231106 A1* | 12/2003 | Shafer ................ | G06K 19/0702 340/10.34 |
| 2008/0143610 A1* | 6/2008 | Wang ....................... | H01Q 1/22 343/702 |
| 2009/0140932 A1 | 6/2009 | Kurashima | |
| 2014/0071004 A1* | 3/2014 | Jenwatanavet .......... | H01Q 1/46 343/720 |
| 2014/0091974 A1* | 4/2014 | Desclos ................... | H01Q 3/00 343/745 |

OTHER PUBLICATIONS

Taiwan Intellectual Property Office, "Office Action", issued on Jan. 20, 2017.

* cited by examiner

*Primary Examiner* — Simon Nguyen
(74) *Attorney, Agent, or Firm* — WPAT, PC; Justin King

(57) ABSTRACT

A wireless mobile device using a battery as an antenna is provided. The wireless mobile device includes a battery, a system circuit, a RF choke and a DC blocker. The battery has a positive terminal and a negative terminal. The system circuit has a voltage terminal and a RF terminal. The RF choke is connected between the positive terminal of the battery and the voltage terminal of the system circuit. The DC blocker is connected between the positive terminal of the battery and the RF terminal of the system circuit.

4 Claims, 3 Drawing Sheets

WIRELESS MOBILE DEVICE

This application claims the benefit of Taiwan Patent Application No. 104132392, filed Oct. 1, 2015, the subject matter of which is incorporated herein by reference.

FIELD OF THE INVENTION

The present invention relates to a wireless mobile device, and more particularly to a wireless mobile device using a battery as an antenna.

BACKGROUND OF THE INVENTION

FIG. 1 is a schematic functional block diagram illustrating the architecture of a conventional wireless mobile device. The wireless mobile device 100 comprises a battery 101 and a system circuit 102. The battery 101 is connected with the system circuit 102 to provide a voltage Vin that is required for the system circuit 102. The antenna 103 is connected with the system circuit 102. The antenna 103 is a medium for receiving and transmitting a wireless RF signal. Generally, the battery 101 and the antenna 103 are two essential components of the wireless mobile device 100. Since the battery 101 has a metal case (not shown), the performance of the antenna 103 is largely influenced by the battery 101. Consequently, according to the conventional concept of designing the wireless mobile device 100, the battery 101 and the antenna 103 are separated from each other by a specified distance. Due to the specified distance, the influence of the battery 101 on the antenna 103 is avoided.

FIG. 2 is a schematic functional block diagram illustrating the architecture of a conventional wireless mobile device with a near field communication (NFC) function. The wireless mobile device 200 comprises a battery 201, a NFC antenna 203 and a system circuit 210. The battery 201 is connected with the system circuit 210 to provide a voltage Vin that is required for the system circuit 210. The NFC antenna 203 is connected with the system circuit 210. The NFC antenna 203 is a medium for receiving and transmitting a NFC signal. Moreover, a ferrite material layer 202 is arranged between the battery 201 and the NFC antenna 203.

Generally, the near field communication technology is a low-frequency low-distance communication technology. Since the transmission frequency of the NFC technology is lower, the size of the NFC antenna 203 is larger. Moreover, for integrating the NFC antenna 203 into the wireless mobile device 200 while maintaining the slimness of the wireless mobile device 200, the NFC antenna 203 is disposed over the battery 201. Moreover, it is necessary to interpose the ferrite material layer 202 between the battery 201 and the NFC antenna 203. Since the ferrite material layer 202 has a property of absorbing electromagnetic wave, the NFC signal is directed toward the ferrite material layer 202. Under this circumstance, the NFC signal is transmitted through the NFC antenna 203, and thus the low-frequency low-distance communication efficacy of the NFC technology is enhanced.

Due to the ferrite material layer 202, the influence of the battery 201 on the NFC antenna 203 is minimized. However, the battery 201 and the NFC antenna 203 of the wireless mobile device 200 are individual and essential components that are structurally combined together.

FIG. 3 is a schematic functional block diagram illustrating the architecture of a conventional wireless mobile device with a buzzer. The wireless mobile device 300 comprises a battery 301, a system circuit 302 and a buzzer 303. The battery 301 is connected with the system circuit 302 to provide a voltage Vin that is required for the system circuit 302. The buzzer 303 is connected with the system circuit 302.

Generally, the buzzer 303 is made of a metallic material. The system circuit 302 issues a PWM (pulse width modulation) signal to drive the buzzer 303. Moreover, a radio frequency (RF) transceiver terminal of the system circuit 302 is connected with the buzzer 303. Consequently, the buzzer 303 is also used as an antenna. However, if the product is not equipped with the buzzer 303, this device cannot be implemented.

SUMMARY OF THE INVENTION

An embodiment of the present invention provides a wireless mobile device. The wireless mobile device includes a battery, a system circuit, a RF choke and a DC blocker. The battery has a positive terminal and a negative terminal. The system circuit has a voltage terminal and a RF terminal. The RF choke is connected between the positive terminal of the battery and the voltage terminal of the system circuit. The DC blocker is connected between the positive terminal of the battery and the RF terminal of the system circuit.

Another embodiment of the present invention provides a wireless mobile device. The wireless mobile device includes a battery, a system circuit, a RF choke and a DC blocker. The battery has a positive terminal and a negative terminal. The system circuit has a voltage terminal and a RF terminal. The RF choke is connected between the negative terminal of the battery and a ground terminal. The DC blocker is connected between the negative terminal of the battery and the RF terminal of the system circuit.

A further embodiment of the present invention provides a wireless mobile device. The wireless mobile device includes a battery, a system circuit, a first RF choke, a second RF choke, a first DC blocker and a second DC blocker. The battery has a positive terminal and a negative terminal. The system circuit has a voltage terminal and a RF terminal. The first RF choke is connected between the positive terminal of the battery and the voltage terminal of the system circuit. The second RF choke is connected between the negative terminal of the battery and a ground terminal. The first DC blocker is connected between the negative terminal of the battery and the RF terminal of the system circuit. A first terminal of the second DC blocker is connected with the positive terminal of the battery. A second terminal of the second DC blocker is connected with the RF terminal of the system circuit or the negative terminal of the battery.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
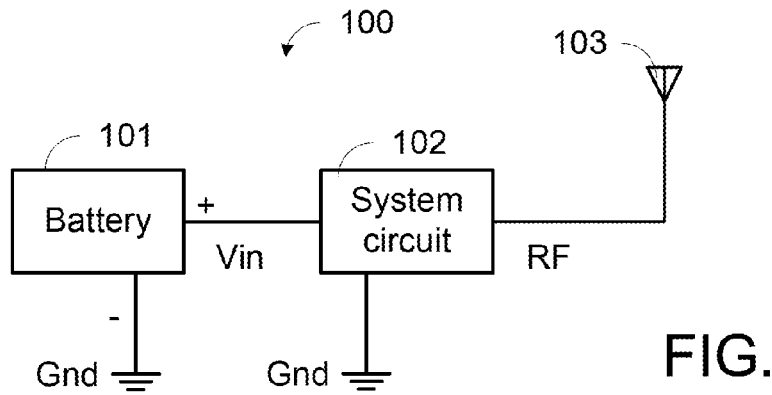
FIG. 1 (prior art) is a schematic functional block diagram illustrating the architecture of a conventional wireless mobile device.
Figure 2:
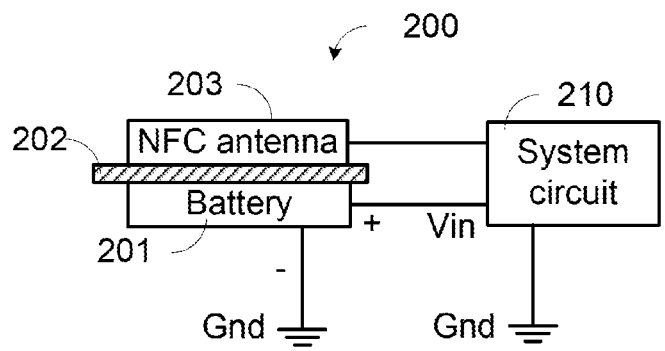
FIG. 2 (prior art) is a schematic functional block diagram illustrating the architecture of a conventional wireless mobile device with a NFC function.
Figure 3:
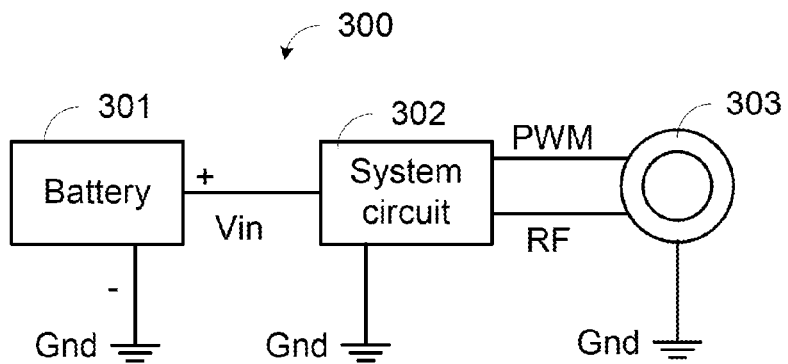
FIG. 3 (prior art) is a schematic functional block diagram illustrating the architecture of a conventional wireless mobile device with a buzzer.
Figure 4:
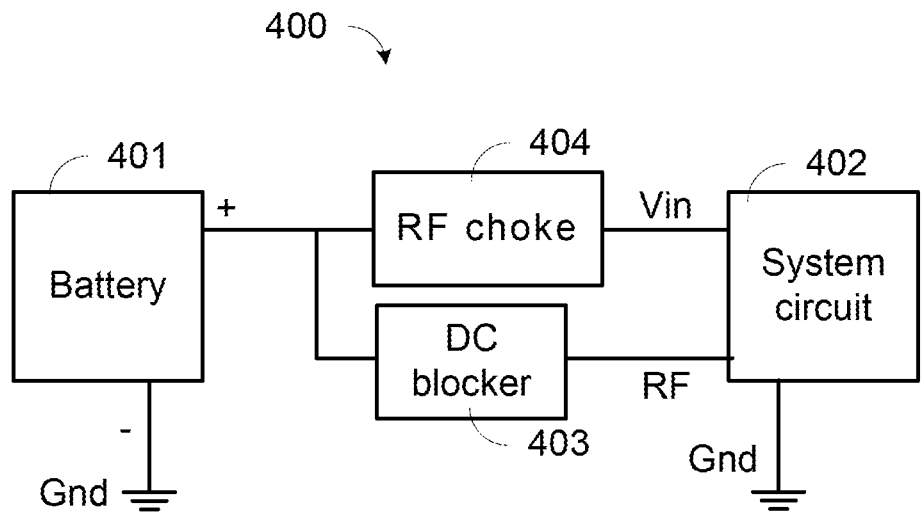
FIG. 4 is a schematic functional block diagram illustrating the architecture of a wireless mobile device according to a first embodiment of the present invention.

FIG. 4 is a schematic functional block diagram illustrating the architecture of a wireless mobile device according to a first embodiment of the present invention. As shown in FIG. 4, the wireless mobile device 400 comprises a battery 401, a system circuit 402, a DC blocker 403 and a radio frequency choke (RF choke) 404. The RF choke 404 is connected between a positive terminal of the battery 401 and the system circuit 402. The battery 401 is connected with the system circuit 402 to provide a voltage Vin that is required for the system circuit 402. In addition, the DC blocker 403 is connected between the positive terminal of the battery 401 and the system circuit 402. Consequently, the positive terminal of the battery 401 can be used as a medium for receiving and transmitting a wireless RF signal.

In this embodiment, the positive terminal of the battery 401 is used as an antenna. For example, the battery 401 is a circular CR2032 coin battery with a dimension of 20 mm (diameter)×3.2 mm (thickness). The positive terminal of the battery 401 is made of a metallic material. The DC blocker 403 is connected between the positive terminal of the battery 401 and a RF terminal of the system circuit 402. Due to the DC blocker 403, the voltage Vin provided from the positive terminal of the battery 401 will not destroy the radio frequency signal RF.

Moreover, the RF choke 404 is connected between the positive terminal of the battery 401 and a voltage terminal Vin of the system circuit 402 in order to block the radio frequency signal RF. Due to the RF choke 404, the radio frequency signal RF will not leak to the voltage terminal Vin of the system circuit 402. Under this circumstance, the interference of the power noise is largely reduced. Consequently, the battery 401 can provide the voltage Vin for powering the system circuit 402, and the positive terminal of the battery 401 can be used as the antenna.

In this embodiment, the positive terminal of the battery 401 is used as the antenna, and a negative terminal of the battery 401 is connected to a ground terminal Gnd. It is noted that numerous modifications and alterations may be made while retaining the teachings of the invention. For example, while a RF impedance matching operation is performed, a matching circuit is connected between the negative terminal of the battery 401 and the ground terminal Gnd.

Figure 5:
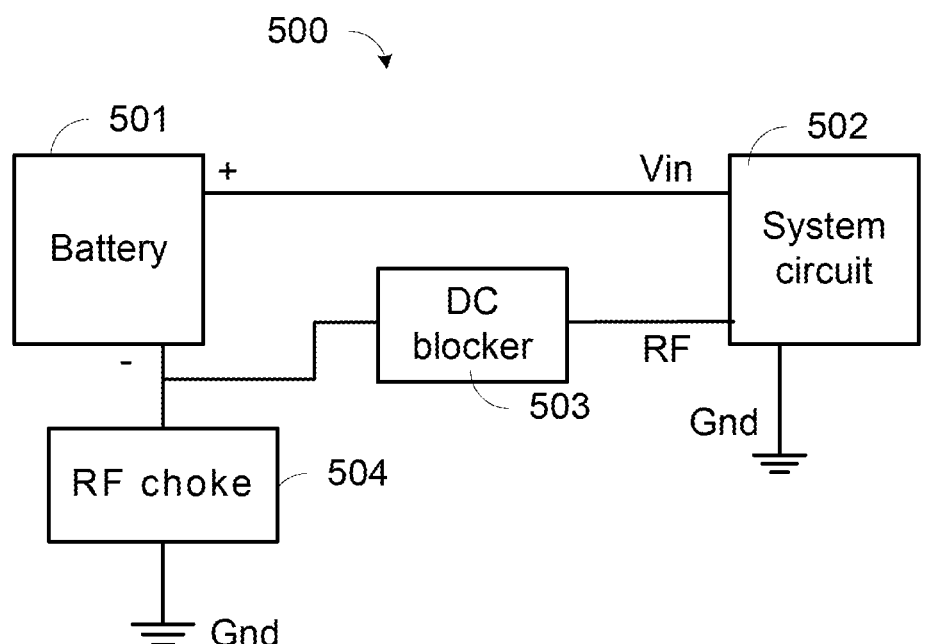
FIG. 5 is a schematic functional block diagram illustrating the architecture of a wireless mobile device according to a second embodiment of the present invention.

FIG. 5 is a schematic functional block diagram illustrating the architecture of a wireless mobile device according to a second embodiment of the present invention. As shown in FIG. 5, the wireless mobile device 500 comprises a battery 501, a system circuit 502, a DC blocker 503 and a RF choke 504. A positive terminal of the battery 501 is connected with the system circuit 502. The battery 501 provides a voltage Vin that is required for the system circuit 502. The DC blocker 503 is connected between a negative terminal of the battery 501 and the system circuit 502. Consequently, the negative terminal of the battery 501 can be used as a medium for receiving and transmitting a wireless RF signal. In addition, the RF choke 504 is connected between the negative terminal of the battery 501 and a ground terminal Gnd.

In this embodiment, the negative terminal of the battery 501 is used as an antenna. For example, the battery 501 is a circular CR2032 coin battery with a dimension of 20 mm (diameter)×3.2 mm (thickness). The negative terminal of the battery 501 is made of a metallic material. The DC blocker 503 is connected between the negative terminal of the battery 501 and a RF terminal of the system circuit 502. Due to the DC blocker 503, the RF terminal of the system circuit 502 is not suffered from a DC short-circuited problem.

The RF choke 504 is connected between the negative terminal of the battery 501 and the ground terminal Gnd. Due to the RF choke 504, the RF signal will not be directly guided to the ground terminal Gnd. Consequently, the battery 501 can provide the voltage Vin for powering the system circuit 502, and the negative terminal of the battery 501 can be used as the antenna.

In this embodiment, the negative terminal of the battery 501 is used as the antenna, and the positive terminal of the battery 501 is connected to the voltage terminal Vin of the system circuit 502. It is noted that numerous modifications and alterations may be made while retaining the teachings of the invention. For example, while a RF impedance matching operation is performed, a matching circuit is connected between the positive terminal of the battery 501 and the voltage terminal Vin of the system circuit 502.

Figure 6:
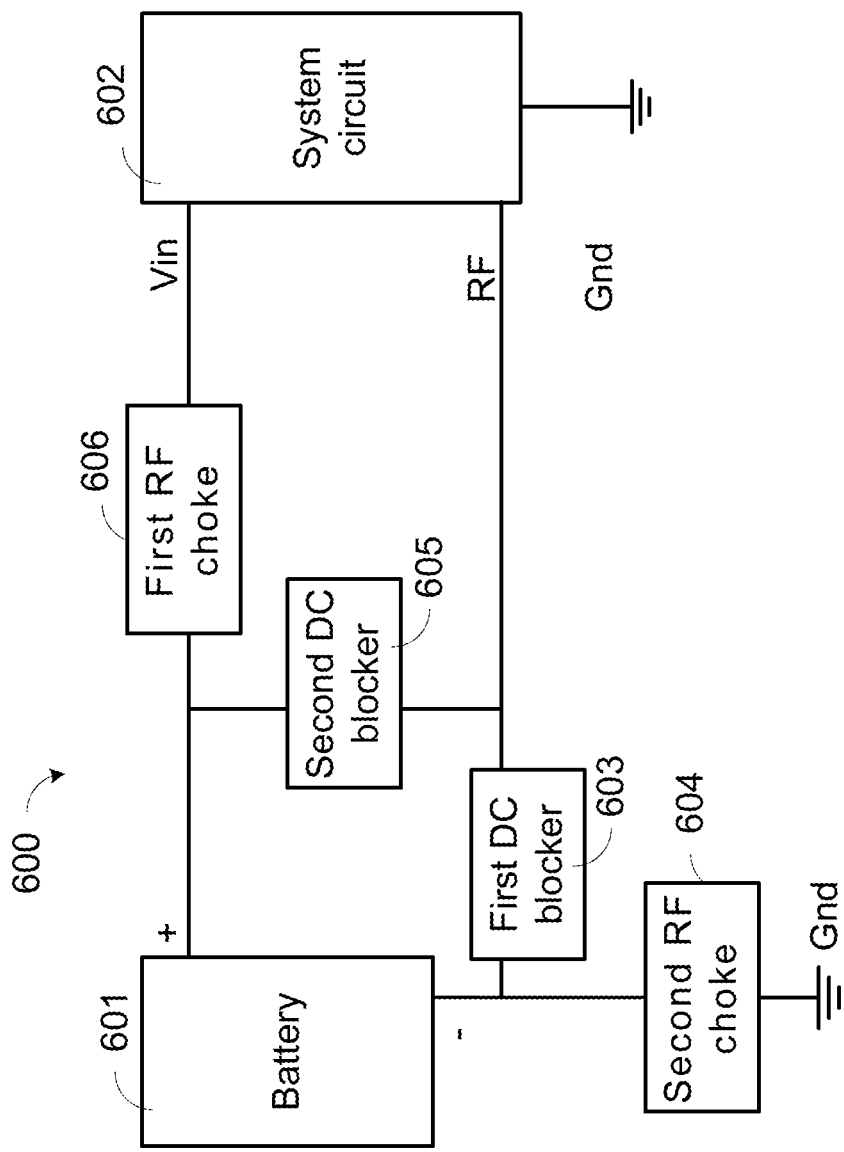
FIG. 6 is a schematic functional block diagram illustrating the architecture of a wireless mobile device according to a third embodiment of the present invention.

FIG. 6 is a schematic functional block diagram illustrating the architecture of a wireless mobile device according to a third embodiment of the present invention. As shown in FIG. 6, the wireless mobile device 600 comprises a battery 601, a system circuit 602, a first DC blocker 603, a second DC blocker 605, a first RF choke 606 and a second RF choke 604. The first RF choke 606 is connected between a positive terminal of the battery 601 and a voltage terminal Vin of the system circuit 602. The battery 601 provides a voltage Vin that is required for the system circuit 602. The first DC blocker 603 is connected between the negative terminal of the battery 601 and the RF terminal of the system circuit 602. The second DC blocker 605 is connected between the positive terminal of the battery 601 and the RF terminal of the system circuit 602. The second RF choke 604 is connected between the negative terminal of the battery 601 and a ground terminal Gnd. Consequently, the positive terminal and the negative terminal of the battery 601 can be used as the media for receiving and transmitting a wireless RF signal.

In this embodiment, the positive terminal and the negative terminal of the battery 601 are used as antennas. For example, the battery 601 is a circular CR2032 coin battery with a dimension of 20 mm (diameter)×3.2 mm (thickness). The positive terminal and the negative terminal of the battery 601 are both made of a metallic material. In this embodiment, the first DC blocker 603 is connected between the negative terminal of the battery 601 and the RF terminal of the system circuit 602, and the second DC blocker 605 is connected between the positive terminal of the battery 601 and the RF terminal of the system circuit 602. Consequently, the interference between the positive terminal and the negative terminal of the battery 601 and the voltage terminal Vin and the RF terminal of the system circuit 602 will be avoided, and the short-circuited problem is solved.

Moreover, the second RF choke 604 is connected between the negative terminal of the battery 601 and the ground terminal Gnd, and the first RF choke 606 is connected between the positive terminal of the battery 601 and the voltage terminal Vin of the system circuit 602. Consequently, the battery 601 provides electric energy for powering the system circuit 602, and the positive terminal and the negative terminal of the battery 601 are used as the antennas.

It is noted that numerous modifications and alterations may be made while retaining the teachings of the invention. For example, in another embodiment, the second DC blocker 605 is connected between the positive terminal of the battery 601 and the negative terminal of the battery 601.

In the above embodiments, the RF chokes are inductors, and the DC blockers are capacitors. The batteries are circular CR2032 coin batteries. It is noted that the type of the battery may be altered according to the practical requirements.

From the above descriptions, the battery of the wireless mobile device is capable of providing electric energy for powering the system circuit, and the battery is used as an antenna. Consequently, the volume of the wireless mobile device is reduced, the antenna is not used, and the manufacture cost of the wireless mobile device is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless mobile device, comprising:
   a battery having a positive terminal and a negative terminal, wherein the wireless mobile device uses the battery as an antenna;
   a system circuit having a voltage terminal and a RF terminal;
   a first RF choke connected between the positive terminal of the battery and the voltage terminal of the system circuit;
   a second RF choke connected between the negative terminal of the battery and a ground terminal;
   a first DC blocker connected between the negative terminal of the battery and the RF terminal of the system circuit; and
   a second DC blocker, wherein a first terminal of the second DC blocker is connected with the positive terminal of the battery, and a second terminal of the second DC blocker is connected with the RF terminal of the system circuit or the negative terminal of the battery.

2. The wireless mobile device as claimed in claim 1, wherein the battery is a coin battery.

3. The wireless mobile device as claimed in claim 1, wherein the first RF choke and the second RF choke are inductors.

4. The wireless mobile device as claimed in claim 1, wherein the first DC blocker and the second DC blocker are capacitors.

\* \* \* \* \*